United States Patent
El Khadir et al.

(10) Patent No.: US 11,420,328 B2
(45) Date of Patent: Aug. 23, 2022

(54) GENERATING A ROBOT CONTROL POLICY FROM DEMONSTRATIONS

(71) Applicant: Google LLC, Mountain View, CA (US)

(72) Inventors: Bachir El Khadir, Princeton, NJ (US); Vikas Sindhwani, Hastings on Hudson, NY (US); Jacob Varley, New York City, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/425,257

(22) PCT Filed: Jan. 31, 2020

(86) PCT No.: PCT/US2020/016151
§ 371 (c)(1),
(2) Date: Jul. 22, 2021

(87) PCT Pub. No.: WO2020/160431
PCT Pub. Date: Aug. 6, 2020

(65) Prior Publication Data
US 2022/0040861 A1    Feb. 10, 2022

Related U.S. Application Data

(60) Provisional application No. 62/800,378, filed on Feb. 1, 2019.

(51) Int. Cl.
*B25J 13/00*        (2006.01)
*B25J 9/16*         (2006.01)
*B25J 9/02*         (2006.01)

(52) U.S. Cl.
CPC ............ *B25J 9/1666* (2013.01); *B25J 9/023* (2013.01); *B25J 9/163* (2013.01)

(58) Field of Classification Search
CPC ........ B25J 9/1664; B25J 9/1697; B25J 9/163; B25J 9/1676; G05B 19/423;
(Continued)

(56) References Cited

U.S. PATENT DOCUMENTS 9,643,314 B2 *   5/2017   Guerin ................... B25J 9/1605
9,684,305 B2 *   6/2017   Kratz ..................... G05D 1/024
(Continued)

FOREIGN PATENT DOCUMENTS

WO        2018148437         8/2018

OTHER PUBLICATIONS

Khansari-Zadeh, S. M., et al. (2011). "Learning Stable Nonlinear Dynamical Systems with Gaussian Mixture Models." IEEE Transactions on Robotics, 27(5), 943-957.
(Continued)

*Primary Examiner* — Dalena Tran
(74) *Attorney, Agent, or Firm* — Middleton Reutlinger (57) ABSTRACT

Learning to effectively imitate human teleoperators, even in unseen, dynamic environments is a promising path to greater autonomy, enabling robots to steadily acquire complex skills from supervision. Various motion generation techniques are described herein that are rooted in contraction theory and sum-of-squares programming for learning a dynamical systems control policy in the form of a polynomial vector field from a given set of demonstrations. Notably, this vector field is provably optimal for the problem of minimizing imitation loss while providing certain continuous-time guarantees on the induced imitation behavior. Techniques herein generalize to new initial and goal poses of the robot and can adapt in real time to dynamic obstacles during execution, with convergence to teleoperator behavior within a well-defined safety tube.

17 Claims, 7 Drawing Sheets

(58) Field of Classification Search
CPC ......... G05B 2219/39271; G06N 20/10; G06N 3/08; G06N 3/0454; Y10S 901/01; Y10S 901/03; Y10S 901/46
USPC ...... 700/245, 259, 257, 258, 264; 901/1, 46; 318/568.12, 568.13
See application file for complete search history.

(56) References Cited

U.S. PATENT DOCUMENTS

| | | | |
|---|---|---|---|
| 2017/0173786 A1* | 6/2017 | Gildert | G06F 3/011 |
| 2017/0269607 A1* | 9/2017 | Fulop | B25J 13/006 |

OTHER PUBLICATIONS

Watterson, M. et al.; "Smooth trajectory generation on SE(3) for a free flying space robot;" 2016 IEEE/RSJ International Conference on Intelligent Robots and Systems (IROS); 8 pages; Oct. 9, 2016.
Sindhwani, V. et al.; "Learning Contracting Vector Fields for Stable Imitation Learning;" Cornell University, arXiv.org; arXiv:1804.04878v1; 9 pages; Apr. 13, 2018.
European Patent Office; International Search Report and Written Opinion of PCT Ser. No. PCT/US2020/016151; 11 pages; dated Jun. 9, 2020.
Khansari-Zadeh, S. M., et al. (2014). "Learning Control Lyapunov Function To Ensure Stability of Dynamical System-Based Robot Reaching Motions." Robotics and Autonomous Systems, 62(6), 752-765.
Khansari-Zadeh, S. M., et al, (2012). "A Dynamical System Approach To Realtime Obstacle Avoidance." Autonomous Robots, 32(4), 433-454.
Khatib, O. (1986). "Real-Time Obstacle Avoidance for Manipulators and Mobile Robots." The International Journal of Robotics Research, 5(1), 90-98.
Billard, A. et al., "Robot Programming by Demonstration;" Handbook of Robotics, Chapter 59; 26 pages; Sep. 7, 2007.
Choi, M-D., "Positive Semidefinite Biquadratic Forms;" Linear Algebra and its Applications, 1975.
Reznick, B. et al., "Real Zeros of Positive Semidefinite Forms. I.;" Mathematische Zeitschrift 171; Springer; pp. 1-26; 1980.
Dai, H. et al., "Synthesis and Optimization of Force Closure Grasps via Sequential Semidefinite Programming;" Robotics Research; Springer; 16 pages; 2017.
Dette, H. et al., "Matrix measures, moment spaces and Favard's theorem for the interval [0, 1] and [0, ];" Linear Algebra and its Applications, vol. 345; pp. 169-193; 2002.
Dragan, A. et al., "Formalizing Assistive Teleoperation;" Carnegie Mellon University, Journal contribution; https://doi.org/10.1184/R1/6554936.v1; 8 pages; 2018.
Ahmadi, A., "Algebraic Relaxations and Hardness Results in Polynomial Optimization and Lyapunov Analysis;" PhD Thesis, MIT; arXiv.org; arXiv:1201.2892v1; 156 pages; Sep. 2011.
Ahmadi, A. et al., "Time-Varying Semidefinite Programs;" arXiv.org, arXiv:1808.03944v2; 34 pages; Dec. 2, 2019.
Ahmadi, A. et al., "Geometry of 3D Environments and Sum of Squares Polynomials;" arXiv.org, arXiv:1611.07369v3; 10 pages; Mar. 7, 2017.
Ahmadi, A. et al., "Towards Scalable Algorithms with Formal Guarantees for Lyapunov Analysis of Control Systems via Algebraic Optimization;" in 53rd IEEE Conference on Decision and Control; 10 pages; Dec. 2014.
Atkeson, C.G. et al., "What Happened at the DARPA Robotics Challenge, and Why?" https://www.cs.cmu.edu/~cga/drc/jfr-what.pdf; 12 pages; 2016.
Aylward, E. et al.; "Stability and Robustness Analysis of Nonlinear Systems via Contraction Metrics and SOS Programming;" http://web.mit.edu/nsl/www/preprints/SOS_metrics.pdf; 8 pages; Dec. 30, 2007.
Fong, T. et al., "Vehicle Teleoperation Interfaces;" Autonomous Robots 11; pp. 9-18; 2001.
Gatermann, K. et al., "Symmetry groups, semidefinite programs, and sums of squares;" arXiv:math/0211450v1; 35 pages; Nov. 28, 2002.
Goldberg, K. et al., "Desktop Teleoperation via the World Wide Web;" Proceedings of 1995 IEEE International Conference on Robotics and Automation (ICRA); 6 pages.
Huber, L. et al., "Avoidance of Convex and Concave Obstacles with Convergence ensured through Contraction;" IEEE Robotics and Automation Letters; 8 pages; Jan. 2019.
Ijspeert, A.J. et al., "Dynamical Movement Primitives: Learning Attractor Models for Motor Behaviors;" Neural Computation, vol. 25; pp. 328-373; 2013.
Jouffroy, J. et al., "A Tutorial on Incremental Stability Analysis using Contraction Theory;" Modeling, Identification and Control, vol. 31, No. 3, pp. 93-106; 2010.
Kappler, D. et al., "Real-time Perception meets Reactive Motion Generation;" arXiv.org, arXiv:1703.03512v3; 9 pages; Oct. 6, 2017.
Keogh, E. et al., "Exact indexing of dynamic time warping;" Knowledge and Information Systems, Springer, 29 pages; 2004.
Khansari-Zadeh, S. M., et al. "Learning Potential Functions from Human Demonstrations with Encapsulated Dynamic and Compliant Behaviors", Autonomous Robots, 23 pages; 2015.
Kojima, M., "Sums of Squares Relaxations of Polynomial Semidefinite Programs;" Research Reports on Mathematical and Computing Sciences Series B: Operations Research; Research Report B-397,15 pages; Nov. 2003.
Kuindersma, S. et al., "Optimization-based Locomotion Planning, Estimation, and Control Design for the Atlas Humanoid Robot;" Autonomous Robots, 40, 3; 46 pages; 2015.
Lasserre, J.B., "Global Optimization with Polynomials and the Problem of Moments;" Society for Industrial and Applied Mathematics, vol. 11, No. 3, pp. 796-817; Jan. 19, 2001.
Lemme, A. et al., "Open-source benchmarking for learned reaching motion generation in robotics;" Paladyn, Journal of Behavioral Robotics, vol. 6, Issue 1; pp. 30-41; 2015.
Lohmiller, W. et al., "On Contraction Analysis for Nonlinear Systems;" http://web.mit.edu/nsl/www/preprints/contraction.pdf; 27 pages; 1997.
Majumdar, A. et al., "Control Design along Trajectories with Sums of Squares Programming;" arXiv.org, arXiv:1210.0888v1; 8 pages; Oct. 2, 2012.
Marturi, N. et al., "Towards advanced robotic manipulation for nuclear decommissioning: a pilot study on tele-operation and autonomy;" International Conference on Robotics and Automation for Humanitarian Applications (RAHA); 8 pages; Dec. 2016.
D'Donoghue, B. et al., "Conic Optimization via Operator Splitting and Homogeneous Self-Dual Embedding;" Journal of Optimization Theory and Applications; 23 pages; Jul. 2016.
Parrilo, P., "Semidefinite programming relaxations for semialgebraic problems;" Math. Program., Ser. B 96; https://doi.org/10.1007/s10107-003-0387-5; pp. 293-320; May 2003.
Pauwels, E. et al., "Inverse optimal control with polynomial optimization;" arXiv.org, arXiv:1403.5180v1; 17 pages Mar. 20, 2014.
Ravichandar, H. et al., "Learning Partially Contracting dynamical Systems from Demonstrations;" 1st Conference an Robot Learning (CoRL); 10 pages; 2017.
Schaal, S., "Is Imitation Learning the Route to Humanoid Robots?" Trends In Cognitive Sciences, 3; 19 pages; 1999.
Scherer, C.W. et al., "Matrix Sum-of-Squares Relaxations for Robust Semi-Definite Programs;" Mathematical Programming; 37 pages; 2006.
Sindhwani, V. et al., "Learning Contracting Vector Fields for Stable Imitation Learning;" arXiv.org; arXiv:1804.04878v1; 9 pages; Apr. 13, 2018.
Taylor, R.H. et al., "Medical Robotics and Computer-Integrated Surgery;" Springer Handbook of Robotics; https://doi.org/10.1007/978-3-540-30301-5_53; pp. 1199-1222; 2008.
Washington, R. et al., "Autonomous Rovers for Mars Exploration;" Proceedings of 1999 IEEE Aerospace Conference; 15 pages; Mar. 1999.

(56) References Cited

OTHER PUBLICATIONS

Zhang, T. et at., "Deep Imitation Learning for Complex Manipulation Tasks from Virtual Reality Teleoperation;" arXiv.org, arXiv:1710.04615v2; 9 pages; Mar. 6, 2018.
Min, P., "Binvox, A 3D Mesh Voxelizer," retrieved from internet https://www.patrickmin.com/ binvox/; 3 pages; retrieved Jul. 16, 2021.
Tan, W. et al., "Searching for Control Lyapunov Functions using Sums of Squares Programming;" https://bcci.me.berkeley.edu/downloads/papers/weehong_3.pdf; 10 pages; 2008.
Khansari-Zadeh, S.M., "Benchmark Handwriting ImitationTasks;" retrieved from internet, https://cs.stanford.edu/people/khansari/download.html; 2 pages; dated Mar. 2015.

\* cited by examiner

GENERATING A ROBOT CONTROL POLICY FROM DEMONSTRATIONS

BACKGROUND

Various techniques have been proposed to enable robots to perform various tasks. For example, some techniques enable a user to kinesthetically teach the robot to follow a particular trajectory. For instance, the user may physically manipulate a robot arm to cause a reference point of an end effector of the robot arm to traverse the particular trajectory—and that particular traversed trajectory may thereafter be repeatable by the robot arm. As another example, while a user uses his or her arm to perform a task like moving to and grasping an object, a camera or other device may obtain visual samples of the movement to determine a trajectory of a reference point of the user's arm, which may then be repeated by a robot arm. However, those and other techniques may suffer from one or more drawbacks, such as those described herein.

The classical way to record a particular trajectory is to generate a time-indexed trajectory, e.g., of individual waypoints. This recorded trajectory can be used as a robot control policy. Whatever the starting point of the end effector reference point, the policy may cause the robot to identify the closest individual waypoint of the time-indexed trajectory, move the end effector reference point to that way point, and then move it along the remainder of the trajectory. However, this technique may not yield optimal results in terms of time required to traverse the trajectory and/or robot wear and tear. Moreover, a robot operating in accordance with such a simple control policy may not be well-suited to deal with dynamic obstacles in the environment.

SUMMARY

In contrast to the approaches described previously which formulate a task using a time-indexed trajectory, in a dynamical systems approach to feedback control, robot motion during a task (for example reaching a cup) is formulated as a differential equation. Such a representation allows better generalization since instead of memorizing the demonstration trajectories, the policy has to capture the essential dynamics underlying the task during training. Additionally, a dynamical systems policy can, by construction, adapt to changes in dynamic environments, making it suitable for use in unstructured environments.

Implementations are described herein for using contraction theory and semidefinite programming to generate, from a set of data points generated during a demonstration, a dynamical systems control policy that regulates both robot motion and robot interaction with an environment. In various implementations, the dynamical systems control policy, which may include and/or take the form of a polynomial contracting vector field (referred to herein as "CVF-P" in some instances), is provably optimal for the problem of minimizing imitation loss while providing continuous-time guarantees on the induced imitation behavior. Techniques described herein facilitate real-time adaptation to dynamic obstacles during execution, with convergence to demonstrated behavior within a well-defined safety tube.

In some implementations, a set of data points sampled during demonstration-based learning of a robot trajectory (also referred to as "imitation learning" or "kinesthetic teaching") is used to calculate a continuous function that corresponds to (e.g., approximates or fits) the trajectory. A polynomial vector field may then be fitted to the continuous function. In some implementations, a neighborhood space that contains the set of data points may be constrained into a contracting region, such as a tube around the robot trajectory. Notably, rather than using optimization techniques such as regression analysis or stochastic gradient descent, in various implementations, semidefinite programming may be employed. In various implementations, it is possible to use semidefinite programming for which a sum-of-squares relaxation yields a globally-optimal solution. Consequently, it is possible to calculate a globally-optimal polynomial vector that has the lowest imitation loss among all polynomial vector fields of a given degree.

To enable obstacle avoidance, in some implementations, an inverse kinematic mapping, "IK," is calculated that maps a position in Cartesian space to a subset of joint space that contains all possible joint configurations that would cause any part of a robot (particularly a robot arm) to occupy the position in Cartesian space. For example, in some implementations, sensor data indicative of a position of obstacle in Cartesian space, such as a point cloud generated by a 3D or 2.5D vision sensor, may be used to calculate a position of the obstacle in joint space. Based on the position of the obstacle in joint space, a repulsive polynomial vector field may be generated for the obstacle. The polynomial vector field of the dynamical systems control policy may then be modulated based on the repulsive polynomial vector field for the object, e.g., by adding the fields together.

In some implementations, the position of the obstacle in joint space may be determined based on a mapping from Cartesian space to joint space. This mapping may be generated, for instance, by discretizing the joint space of the robot into a plurality of discrete positions (e.g., hundreds of thousands). In some implementations, this may include regularly sampling each joint of the robot from a minimum angle to a maximum angle using a predetermined step size, e.g., of 0.1 radians. The robot may then be voxelized at each of the plurality of discrete positions, e.g., using a robot simulation program, to generate a mapping from joint space to Cartesian space. The mapping from Cartesian space to joint space may be calculated an inverse of the mapping from joint space to Cartesian space.

In various implementations, a method may be implemented using one or more processors and may include: receiving a set of data points generated based on sensor data from one or more sensors obtained during imitation learning of a robot trajectory, wherein the imitation learning includes physical manipulation of a reference point from an initial point to a target point; generating a dynamical systems control policy that regulates both robot motion and robot interaction with an environment, wherein generating the dynamical systems control policy comprises: based on the set of data points, calculating a continuous function that corresponds to the robot trajectory, and fitting a polynomial vector field to the continuous function using semidefinite programming, wherein the dynamical systems control policy comprises the polynomial vector field; and controlling a robot based on the dynamical systems control policy.

In various implementations, the method may include constraining a neighborhood space that contains the set of data points into a contracting region. In various implementations, the contracting region comprises a tube around the robot trajectory.

In various implementations, the method may further include: receiving sensor data indicative of a position of obstacle in Cartesian space; determining a position of the obstacle in joint space based on the position of the obstacle in Cartesian space; based on the position of the obstacle in joint space, generating a repulsive polynomial vector field for the obstacle; and modulating the polynomial vector field of the dynamical systems control policy based on the repulsive polynomial vector field for the obstacle. In various implementations, the position of the obstacle in joint space is determined based on a mapping from Cartesian space to joint space.

In various implementations, the mapping may be generated by: discretizing the joint space of the robot into a plurality of discrete positions; voxelizing the robot at each of the plurality of discrete positions to generate a mapping from joint space to Cartesian space; and calculating the mapping from Cartesian space to joint space as an inverse of the mapping from joint space to Cartesian space. In various implementations, the discretizing may include regularly sampling each joint of the robot from a minimum angle to a maximum angle using a predetermined step size.

In addition, some implementations include one or more processors of one or more computing devices, where the one or more processors are operable to execute instructions stored in associated memory, and where the instructions are configured to cause performance of any of the aforementioned methods. Some implementations also include one or more transitory and/or non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
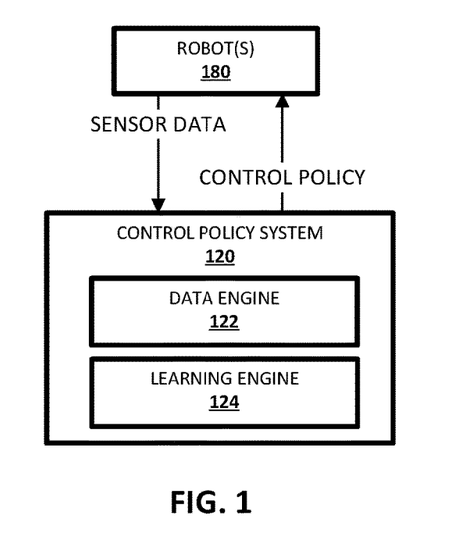
FIG. 1 illustrates an example environment in which techniques described herein may be implemented.

FIG. 1 depicts an example environment in which techniques described herein may be implemented. The example environment includes one or more robots 180 and a control policy system 120. Although the control policy system 120 is illustrated as separate from the robot(s) 180, in some implementations one or more aspects of the control policy system 120 may be implemented by a corresponding one of the one or more robots 180 (e.g., by one or more processors of the robot). For example, in some implementations each of the robot(s) 180 may include an instance of the control policy system 120. In some implementations, one or more (e.g., all) aspects of the control policy system 120 are implemented on a computing system that is separate from the robot(s) 180, such as one or remote computing devices and/or computing systems in network communication with the robot(s) 180. For example, one or more aspects of the control policy system 120 may be implemented by remote computing device(s), the robot(s) 180 may transmit (via one or more networks) data from demonstration(s) to the remote computing devices, the remote computing device(s) may generate the control policy based on the transmitted data, then transmit the generated control policy back to the robot(s) 180.

During a kinesthetic teaching/physical manipulation by a user of one of the robot(s) 180, sensor data is generated by the robot. The sensor data is provided to the control policy system 120. The control policy system 120 generates a group of data points based on the sensor data of the kinesthetic teaching and uses the group of data points in generating a control policy using various techniques described herein. The control policy is provided for use by one or more of the robot(s) 180 (the same robot of the kinesthetic teaching and/or additional robot(s)). Such robot(s) 180 use the control policy to selectively control one or more of its actuators based on the control policy. For example, the control policy may be invoked by such robot(s) 180 in response to detection of an object associated with the control policy, a task associated with the control policy, etc.—and used by the robot in regulating both motion and interaction with the environment.

The control policy system 120 includes a data engine 122 and a learning engine 124. In some implementations, more or fewer engines may be provided. In some implementations, the data engine 122 samples a distributed group of data points and provides them to learning engine 124 for use in generating a control policy. In some implementations, the data engine 122 additionally or alternatively automatically generates a potential gradient for a group of data points, assigns the potential gradient to the data points of the group, and provides the assigned potential gradient to learning engine 124 for use in generating a control policy. The learning engine 124 generates a control policy using one or more groups of data points that are each based on robot sensor data from a corresponding kinesthetic teaching.

Figure 2:
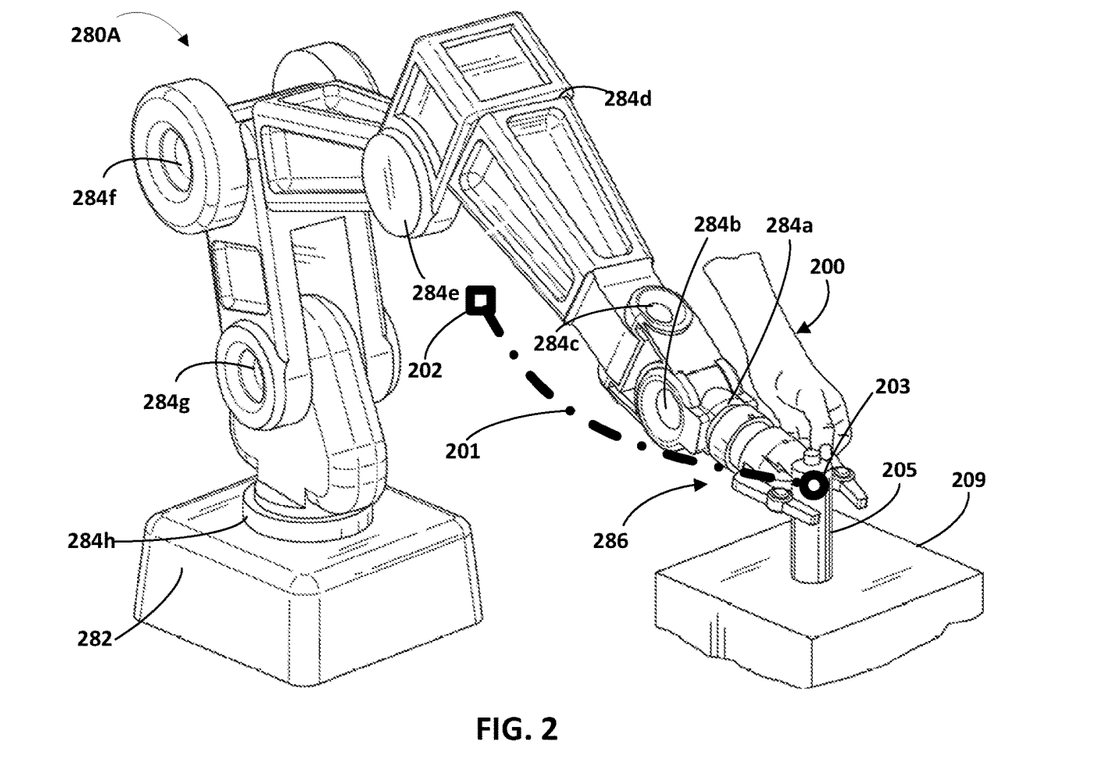
FIG. 2 illustrates an example of a robot that may be utilized in FIG. 1, an example object, and illustrates a user physically manipulating the robot during a kinesthetic teaching.

FIG. 2 illustrates an example of a robot 280A that may be one of the robot(s) 180 utilized in FIG. 1. FIG. 2 also illustrates a user 200 physically grasping an end effector 286 of the robot 280A during physical manipulation of the robot 280A by the user. Also illustrated in FIG. 2 is a spray can 205 resting on a surface 209. As indicated in FIG. 2, the illustrated robot 280A includes a base 282 and eight actuators 284a-h that provide degrees of freedom for the robot and provide the robot 280A with kinematic redundancy. It is noted that the actual actuators 284a-h are located "under" the exterior shell of the robot 280A, but are labeled with reference to the exterior shell in FIG. 2 for the sake of simplicity. Robot 280A may include other actuators, such as one or more actuators that control opening/closing of actuable members of end effector 286, but those are not labeled in FIG. 2 for the sake of clarity and brevity. Robot 280A may be physically manipulated by the user 200 to cause the robot 280A to traverse any one of a plurality of possible trajectories when moving a reference point of end effector 286 from a starting location to a target location. In some implementations, the robot 280A may be in a gravity compensated mode during all or portions of the physical manipulation of the robot 280A by the user.

The trajectory 201 of FIG. 2 illustrates a trajectory followed by a reference point of the end effector 286 during the demonstration (the trajectory is dictated by the physical manipulation of the robot 280A by the user 200). The demonstration started with the reference point at a starting point 202 and ends, as shown in FIG. 2, with the reference point at a target point 203. Sensor data may be generated by the robot 280A during the demonstration, such as sensor data that indicates the pose (i.e., the position and optionally the orientation) of the end effector 286. The sensor data that indicates the pose of the end effector may be, for example, sensor data from one or more position sensors associated with actuators 284a-h that control the pose of the end effector. As described herein, the sensor data may be utilized to generate the data points. For example, the data points may be described in joint space (e.g., as the positions of each of the actuators 284a-h) and/or task or "Cartesian" space (e.g., as the position and orientation of the end effector 286, as derived from the position sensors).

Although not illustrated, robot 280A may also include and/or be in communication with one or more user interface input devices, such as a button or other user interface element located on an exterior surface of the robot 280A, a virtual user interface element provided via a tablet or other computing device in communication with the robot 280A, and/or a microphone included with the robot 280A and/or in communication with the robot. In some of those implementations a user may provide user interface input via the user interface element to, for example: indicate the initiation and/or conclusion of a demonstration.

Although a particular robot 280A is illustrated in FIG. 2, additional and/or alternative robots may be utilized, including robots having other robot arm forms, robots having a humanoid form, robots that move via one or more wheels (e.g., other self-balancing robots), and so forth. Also, although a particular grasping end effector 286 is illustrated in FIG. 2, additional and/or alternative end effectors may be utilized.

And while manual training of a robot arm is demonstrated in FIG. 2, this is not meant to be limiting. In various implementations, other types of kinesthetic teachings ("LfD") may be employed. For example, in some implementations, a user may operate a graphical user interface of a computing device (e.g., touching a touchscreen with a finger or stylus, using a mouse, etc.) to draw one or more trajectories for reference point of end effector 186 from a starting location to a target location. Additionally or alternatively, movement of a user's appendage, such as the user's arm, could also be captured and used to generate one or more trajectories.

Figure 3:
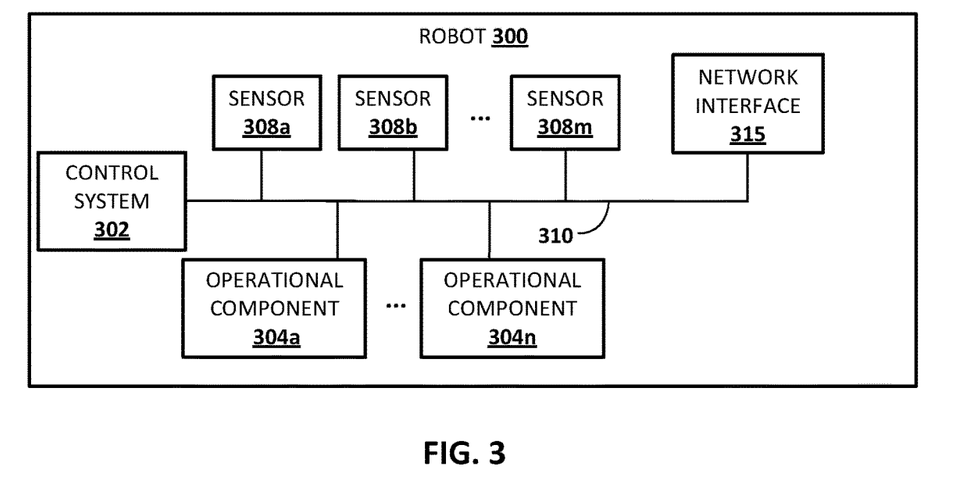
FIG. 3 schematically depicts an example architecture of a robot.

FIG. 3 schematically depicts an example architecture of a robot 300. The robot 300 includes a robot control system 302, one or more operational components 304a-n, and one or more sensors 308a-m. The sensors 308a-m may include, for example, vision sensors (e.g., camera(s), 3D scanners), light sensors, pressure sensors, positional sensors, pressure wave sensors (e.g., microphones), proximity sensors, accelerometers, gyroscopes, thermometers, barometers, and so forth. While sensors 308a-m are depicted as being integral with robot 300, this is not meant to be limiting. In some implementations, sensors 308a-m may be located external to robot 300, e.g., as standalone units.

Operational components 304a-n may include, for example, one or more end effectors (e.g., grasping end effectors) and/or one or more servo motors or other actuators to effectuate movement of one or more components of the robot. For example, the robot 300 may have multiple degrees of freedom and each of the actuators may control actuation of the robot 300 within one or more of the degrees of freedom responsive to control commands provided by the robot control system 302 (e.g., torque and/or other commands generated based on a control policy). As used herein, the term "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 302 may be implemented in one or more processors, such as a CPU, GPU, and/or other controller(s) of the robot 300. In some implementations, the robot 300 may comprise a "brain box" that may include all or aspects of the control system 302. For example, the brain box may provide real time bursts of data to the operational components 304a-n, with each of the real time bursts comprising a set of one or more control commands that dictate, inter alia, the parameters of motion (if any) for each of one or more of the operational components 304a-n. As described herein, the control commands can be at least selectively generated by the control system 302 based on a control policy generated according to one or more techniques disclosed herein.

Although control system 302 is illustrated in FIG. 3 as an integral part of the robot 300, in some implementations, all or aspects of the control system 302 may be implemented in a component that is separate from, but in communication with, robot 300. For example, all or aspects of control system 302 may be implemented on one or more computing devices that are in wired and/or wireless communication with the robot 300, such as computing system 410.

Figure 4:
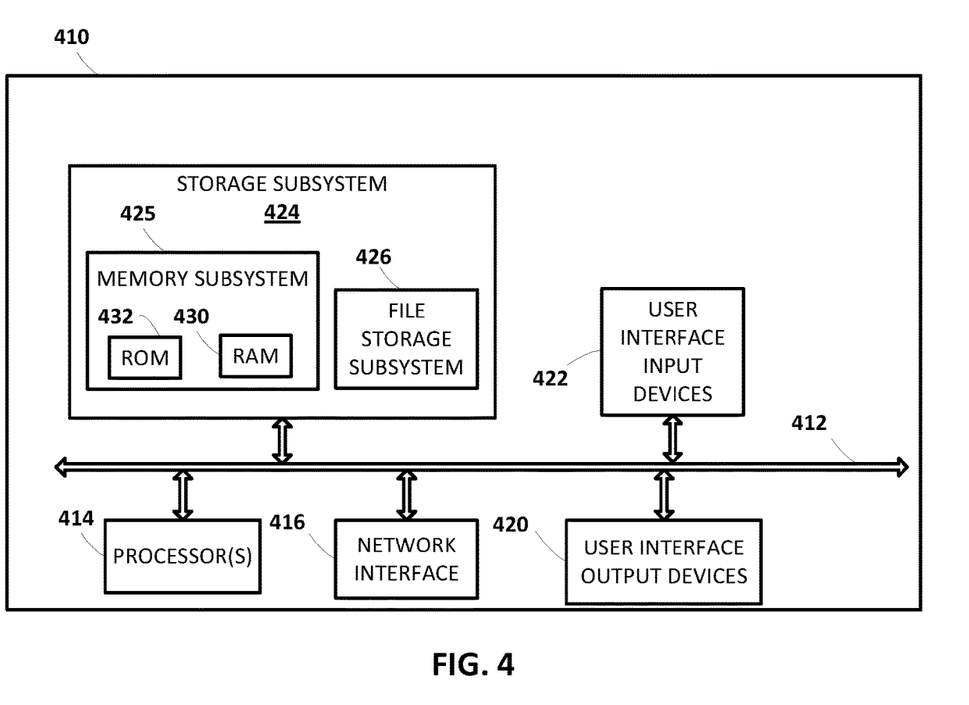
FIG. 4 schematically depicts an example architecture of a computer system.

FIG. 4 is a block diagram of an example computing system 410 that may optionally be utilized to perform one or more aspects of techniques described herein. The computing system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with the computing system 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computing system 410 to the user or to another machine or computing device.

Storage subsystem 424 stores programming and data constructs that provide the functionality of some or all of the modules and methods (e.g., method 700 of FIG. 7) described herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of the computing system 410 communicate with each other as intended. Although bus subsystem 412 is shown schematically as a single bus, alternative implementations of the bus subsystem may use multiple busses.

The computing system 410 can be of varying types including a workstation, server, computing cluster, blade server, server farm, or any other data processing system or computing device. Due to the ever-changing nature of computers and networks, the description of the computing system 410 depicted in FIG. 4 is intended only as a specific example for purposes of illustrating some implementations. Many other configurations of the computing system 410 are possible having more or fewer components than the computing device depicted in FIG. 4.

Learning-from-demonstrations ("LfD") or imitation learning involves inference of a dynamical systems control policy from a relatively small number of demonstrations. Such a dynamical systems control policy can then bootstrap data-efficient reinforcement learning for challenging tasks. With imitation learning, in some cases, the demonstrator (e.g., a robot technician) attempts to ensure that the robot's motions capture the relevant semantics of the task rather than requiring the robot to understand the semantics. The learned dynamical systems control policy may take over operation of the robot, e.g., from a teleoperator, and enable the robot to repeatedly execute the desired task even in dynamically changing conditions. For example, the origin of a picking task and the goal of a placing task may dynamically shift to configurations unseen during training, and dynamic obstacles may be encountered during execution. Dynamic obstacles are particularly relevant in collaborative human-robot workspaces where safety guarantees are paramount. In such situations, when faced with an obstacle, the robot can no longer follow the demonstration path anymore and should re-compute a new motion trajectory in real-time to avoid collision and still attempt to accomplish the desired task.

In some implementations, such real-time adaptation can be achieved by associating demonstrations with a dynamical system. In some implementations, a vector field may be generated that defines a closed-loop velocity dynamical systems control policy. From any state that the robot finds itself in, the vector field may be used to steer the robot back towards the desired imitation behavior, without the need for path re-planning using conventional approaches. One advantage of the learned vector field is that it can be modulated in real-time in order to avoid collisions with obstacles.

Figure 5A:
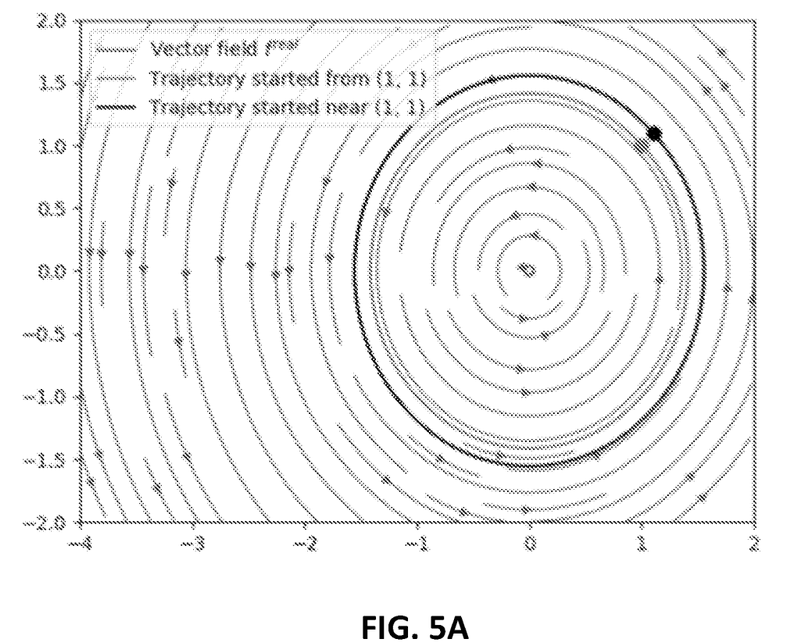
FIGS. 5A and 5B depict examples of a problem addressed using techniques described herein.
Figure 5B:
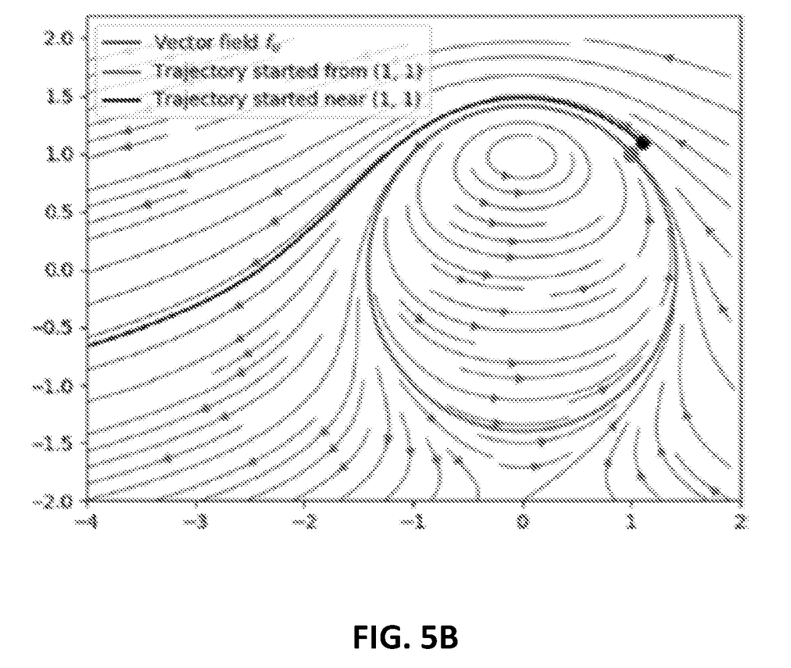

In general, the problem of imitation learning of a dynamical system, $\dot{x}=f(x)$) from samples $(x, \dot{x})$ can be solved as a regression problem: minimize imitation loss $\Sigma_{i,t}\|(x^{(i)}(t))-\Sigma_{i,t}\|(x^{(i)}(t))-\dot{x}^{(i)}(t)\|_2^2$ over a suitable family of vector valued maps, $f \in \mathcal{F}$. However, a naive supervised regression approach may be inadequate. In FIG. 5A, the illustrated goal is to have a robot arm imitate a circular trajectory. However, as shown in FIG. 5B, estimating vector fields from a small number of trajectories sampled in discrete-time can lead to instability. In particular, in FIG. 5B, the estimated field diverges when the initial conditions are even slightly different from those encountered during training. Accordingly, stability constraints are often used with existing approaches. However, these approaches have one or more of the following limitations. They involve non-convex optimization for dynamics fitting and constructing Lyapunov stability certificates respectively, and hence provide no end-to-end optimality guarantees. Additionally, the notion of stability is not trajectory-centric, but rather focused on reaching a single desired equilibrium point. Finally, these approaches are computationally infeasible when formulated in continuous-time.

Accordingly, implementations described herein are usable to formulate a continuous time optimization problem over vector fields involving an imitation loss, subject to a constraint that turns the neighborhood of demonstrations into contracting regions. Within this region, all trajectories are guaranteed to coalesce towards the demonstration exponentially fast. As will be explained herein, such a formulation leads to an instance of time-varying semidefinite programming for which a sum-of-squares ("SOS") relaxation is exact. Hence, techniques described herein are able to find the globally optimal polynomial vector field that has the lowest imitation loss among all polynomial vector fields of a given degree that are contracting on a region around the demonstrations in continuous time.

Problem Statement

Implementations described herein may be used to estimate an unknown continuous time autonomous dynamical system:

$$\dot{x}=f^{real}(x), \qquad (1)$$

where $f^{real}: \mathbb{R}^n \to \mathbb{R}^n$ is an unknown continuously differentiable function.

To implement techniques described herein, one more sample trajectories may be accessed: $x^{(i)}:[0, T] \mapsto \mathbb{R}^n$ that satisfy $\dot{x}^{(i)}=f^{real}(x^{(i)}) \forall t \in [0, T]$, where $T>0$ and $i=1, \ldots, M$. These trajectories $(x^{(i)}, i=1, \ldots, M)$ may be used as training data, with a goal to search for an approximation of the vector field $f^{real}$ in a class of functions of interest $\mathcal{F}$ that reproduces trajectories as close as possible to the one observed during training. In other words, techniques described herein seek to solve the following continuous time least squares optimization problem ("LSP"):

$$f^* \in \operatorname*{argmin}_{f \in \mathcal{F}} \sum_{i=1}^{M} \int_{t=0}^{T} \|f(x^{(i)}(t)) - \dot{x}^{(i)}(t)\|_2^2. \tag{LSP}$$

In addition to consistency with $f_{real}$, a vector field f learned using techniques described herein may be generalized to conditions that were not encountered in the training data. The LSP problem generally admits multiple solutions, as it only dictates how the vector field should behave on the sample trajectories. This under-specification can easily lead to overfitting, especially if the class of function $\mathcal{F}$ is expressive enough. The example of FIGS. 5A and 5B reinforces this phenomenon even for a simple circular motion.

Incremental Stability and Contraction Analysis

Notions of stability called incremental stability and contraction analysis tools are associated with the convergence of system trajectories with each other, as opposed to classical Lyapunov stability which is with respect to a single equilibrium. Contraction analysis derives sufficient and necessary conditions under which the displacement between any two trajectories will go to zero.

Contraction analysis of a system $\dot{x}=f(x)$ can be explained by considering the dynamics of $\delta x(t)$, the infinitesimal displacement between two trajectories:

$$\dot{\delta x} = J_f(x)\delta x \text{ where } J_f(x) = \frac{\partial}{\partial x} f.$$

From this equation it is possible to derive the rate of change of the infinitesimal squared distance between two trajectories $\|\delta x\|_2^2 = \delta x^T \delta x$ as follows:

$$\frac{d}{dt}\|\delta x\|_2^2 = 2\delta x^T \dot{\delta x} = 2\delta x^T J_f(x)\delta x. \tag{2}$$

More generally, it is possible to consider the infinitesimal squared distance with respect to a metric that is different from the Euclidian metric. A metric is given by smooth, matrix-valued function M: $\mathbb{R}^+ \times \mathbb{R}^n \mapsto \mathbb{R}^{n \times n}$ that is uniformly positive definite, i.e. there exists $\epsilon > 0$ such that $$M(t,x) \succeq \epsilon I \forall t \in \mathbb{R}^+, \forall x \in \mathbb{R}^n, \tag{3}$$

where I is the identity matrix and the relation $A \succeq B$ between two symmetric matrices A and B is used to denote that the smallest eigenvalue of their difference A−B is nonnegative.

The squared norm of an infinitesimal displacement between two trajectories with respect to this metric is given by $\|\delta x\|_{M(x)}^2 := \delta x^T M(x)\delta x$. The Euclidean metric corresponds to the case where M(x) is constant and equal to the identity matrix.

Similarly to equation (2), the rate of change of the squared norm of an infinitesimal displacement with respect to a metric M(x) follows the following dynamics:

$$\frac{d}{dt}\|\delta x\|_M(x)^2 = \delta x^T (sym[M(x)J_f(x)] + \dot{M}(x))\delta x, \tag{4}$$

where sym[M] denotes $$\frac{M + M^T}{2}$$

for any square matrix M and $\dot{M}(x)$ is the n×n matrix whose (i,j)-entry is $\nabla M_{ij}(x)^T f(x)$. This motivates the following definition of contraction.

Definition 1 (Contraction): For a positive constant τ, a subset U of $\mathbb{R}^n$, of and positive definite matrix function M: $\mathbb{R}^n \to \mathbb{R}^{n \times n}$, the system $\dot{x}=f(x)$ is said to be τ-contracting on the region U with respect to M if $$sym[M(x)J_f(x)] + \dot{M}(x) \preceq -\tau M(x) \forall x \in U. \tag{5}$$

Remark 1: When the vector field f is a linear function $\dot{x}=Ax$, and the metric M(x) is constant M(x)=P, it can be seen that contraction condition (5) is in fact equivalent to a global stability condition, $$P \succ 0 \text{ and } -PA^T - AP \succ 0 \tag{6}$$

Given a τ-contracting vector field with respect to a metric M(x), it can be concluded from the dynamics in Equation (4) that $$\frac{d}{dt}\|\delta x\|_{M(x)}^2 \le -\tau \|\delta x\|_{M(x)}$$

Integrating both sides yields, $$\|\delta x\|_{M(x)} \le e^{-\frac{\tau}{2}t}\|\delta x(0)\|_{M(x)}$$

Hence, any infinitesimal length $\|\delta x\|_{M(x)}$ (and by assumption, $\|\delta x\|_2$) converges exponentially to zero as time goes to infinity. This implies that in a contraction region, trajectories will tend to together converge towards a nominal path. If the entire state-space is contracting and a finite equilibrium exists, then this equilibrium is unique and all trajectories converge to this equilibrium.

It is also possible to globally solve the following continuous-time vector field optimization problem to fit a contracting vector field to the training data given some fixed metric M(x). This will be referred to herein as the least squares problem with contraction ("LSPC"):

$$\min_{f \in \mathcal{F}} \sum_{i=1}^{M} \int_{t=0}^{T} \|f(x^{(i)}(t)) - \dot{x}^{(i)}(t)\|_2^2 \tag{LSPC}$$

s. t. f contracts on a region $U \subseteq \mathbb{R}^n$
containing the demonstrations $x^{(i)}(t)$
with respect to the metric M(x).

The search for a contraction metric itself may be interpreted as the search for a Lyapunov function of the specific form $V(x)=f(x)^T M(x) f(x)$. As is the case with Lyapunov analysis in general, finding such an incremental stability certificate for a given dynamical system is a nontrivial problem. If one wishes to find the vector field and a corresponding contraction metric at the same time, then the problem becomes non-convex. A common approach to handle this kind of problems is to optimize over one parameter at a time and fix the other one to its latest value and then alternate (i.e. fix a contraction metric and fit the vector field, then fix the vector field and improve on the contraction metric.)

Next, an explanation will be provided for how to formulate and solve the problem of learning a contracting vector field from demonstrations described in LSPC. It is possible to formulate it as a time-varying semidefinite problem, which can be solved in some implementations using sum of squares programming.

Time-varying semidefinite problems (TV-SDP) optimization programs will be referred to herein in the form:

$$\min_{f \in \mathcal{F}} L(f) \qquad \text{(TV-SDP)}$$
$$\text{s.t.} \ \mathcal{L}_i f(t) \succeq 0 \forall \ i = 1, \ldots, m \forall \ t \in [0, T],$$

where the variable $t \in [0, T]$ stands for time, the loss function $L: \mathcal{F} \mapsto \mathbb{R}$ in the objective is assumed to be convex and the $\mathcal{L}$ (i=1,...,m) are linear functionals that map an element $f \in \mathcal{F}$ to a matrix-valued function $\mathcal{L}_i f : [0, T] \mapsto \mathbb{R}^{n \times n}$. The space of functions $\mathcal{F}$ may be restricted to be the space of functions whose components are polynomials of degree $d \in \mathbb{N}$ $$\mathcal{F} := \{f: \mathbb{R}^n \mapsto \mathbb{R}^n | f_i \in \mathbb{R}_d[x]\}, \qquad (7)$$

and it can be assumed that $\mapsto f$ is a matrix with polynomial entries. Polynomial functions can approximate most functions reasonably well and are suitable for algorithmic operations as will be described shortly.

In various implementations, the problem in LSPC of fitting a vector field $f: \mathbb{R}^n \mapsto \mathbb{R}^n$ to m sample trajectories $\{(x^{(i)}(t), \dot{x}^{(i)}(t)) | t \in [0, T], i=1, \ldots, m\}$ can be reformulated as a TV-SDP. For this problem to fit within frameworks described herein, each trajectory $x^{(i)}(t)$ may be approximated with a polynomial function of time $$x^{(i)}_{\text{poly}}(t).$$

The decision variable may be the polynomial vector field f and the following objective function (which is already convex and quadratic) can be optimized:

$$L(f) := \sum_{i=1}^{M} \int_{t=0}^{T} \left\| f\left(x^{(i)}_{\text{poly}}(t)\right) - \left(\dot{x}^{(i)}_{\text{poly}}(t)\right) \right\|_2^2 dt \qquad (8)$$

In order to impose the contraction of the vector field f over some region around the trajectories in demonstration, a smoothness argument may be used to claim that it is sufficient to impose contraction only on the trajectories themselves. Put another way, $$\mathcal{L}_i f(\cdot) := -sym\left[M\left(x^{(i)}_{\text{poly}}(\cdot)\right) J_f\left(x^{(i)}_{\text{poly}}(\cdot)\right)\right] - \qquad (9)$$
$$\dot{M}\left(x^{(i)}_{\text{poly}}(\cdot)\right) - \tau M\left(x^{(i)}_{\text{poly}}(\cdot)\right),$$

where M(x) is some known contraction metric.

Sum of Squares Programming

The notions of sum-of-squares ("SOS") programming and its applications to polynomial optimization will now be reviewed, as well as how to apply SOS programming for learning a polynomial contracting vector field, or "CVF-P." SOS techniques have found several applications in robotics, such as constructing Lyapunov functions, locomotion planning, design and verification of provably safe controllers, grasping and manipulation, inverse optimal control and modeling 3D geometry.

Let $\mathbb{R}_d[x]$ be the ring of polynomials p(x) in real variables $x=(x_1, \ldots, x_n)$ with real coefficients of degree at most d. A polynomial $p \in \mathbb{R}_{[x]}$ is nonnegative if $p(x) \geq 0$ for every $x \in \mathbb{R}^n$. In many applications, a goal may be to find the coefficients of one (or several) polynomials without violating some nonnegativity constraints. While the notion of nonnegativity is conceptually easy to understand, testing whether a given polynomial is nonnegative is known to be NP-hard as soon as the degree $d \geq 4$ and the number of variables $n \geq 3$.

A polynomial $p \in \mathbb{R}_{[x]}$ is SOS if there exists polynomials $q_1, \ldots, q_m \in \mathbb{R}_d[x]$ such that $$p(x) = \Sigma_{i=1}^m q_i(x)^2 \qquad (10)$$

One feature of the set of SOS polynomials is that optimizing over it can be cast a tractable size semidefinite program. In fact, a polynomial p(x) of degree d can be decomposed if and only if there exists a positive semidefinite matrix Q such that $$p(x) = z(x)^T Q z(x) \forall x \in \mathbb{R}^n,$$

where z(x) is the vector of monomials of x up to degree $$\frac{d}{2},$$

and the equality between me two sides of the equation is equivalent to a set of linear equalities in the coefficients of the polynomial p(x) and the entries of the matrix Q.

If a polynomial p(x) is SOS, then it is nonnegative, and the matrix Q acts as a certificate of this fact, making it practical to check that the polynomial at hand is nonnegative for every value of the vector x. In order to use similar techniques to impose contraction of a vector field, a slight generalization of this concept may be employed to ensure that a matrix-valued polynomial P(x) is positive semidefinite (PSD) for all values of x. It is also possible to consider the scalar-valued polynomial $q(x,u) := u^T P(x) u$, where u is a nx1 vector of new indeterminates, as positive semidefiniteness of P is equivalent to the non-negativity of q. If q is SOS, then it can be said that P is a sum-of-squares matrix ("SOSM"). Consequently, optimizing over SOSM matrices is a tractable problem.

A natural question that arises is how much is lost by restricting techniques described herein to the set of SOSM matrices, as opposed the set of PSD matrices. In general, these two sets are quite different. However, all the matrices considered are univariate as they depend only on the variable of time t. It turns out that in this special case, these two notions are equivalent.

Theorem 1: A matrix-valued polynomial P(t) is PSD everywhere (i.e. $P(t) \succeq 0 \forall t \in \mathbb{R}$) if and only if the associated polynomial $p(t, u) := uP(t)u$ is SOS.

The next theorem generalizes this result to the case where PSD-ness is imposed only on the interval [0, T] (as opposed to t∈ℝ)

Theorem 2: A matrix-valued polynomial P(t) of degree d is PSD on the interval [0, T] (i. e. P(t)≽0⇔t∈[0, T]) if and only if can be written as:

$$\begin{cases} P(t) = tV(t) + (T-t)W(t) & \text{if } deg(P) \text{ odd,} \\ P(t) = V(t) + t(T-t)W(t) & \text{if } deg(P) \text{ even.} \end{cases}$$

where V and W are SOSM. In the first case, V and W have degree at most deg (P)−1, and in the second case V (resp.) has degree at most deg (P) (resp. deg (P)). When that is the case, it can be said that P(t) is SOSM on [0, T].

The following theorem states that the problem fitting a CFV-P to polynomial data can be cast as a semidefinite program.

Theorem 3: The following semidefinite program $$\min_{f \in \mathcal{F}} \sum_{i=1}^{M} \int_{t=0}^{T} \left\| f\left(x_p^{(i)}(t)\right) - \dot{x}_p^{(i)}(t) \right\|_2^2 dt \quad \text{(LSPC-SOS)}$$

s.t. $\mathcal{L}_i f$ is SOSM on [0, T] for i = 1, ..., m.

with $\mathcal{F}$, $\mathcal{L}_i$, and L finding the polynomial vector field that has the lowest fitting error L(f) among all polynomial vector fields of degree that are contracting on a region around the demonstrations $x_p^{(i)}$.

To reiterate, the above sum-of-squares relaxation leads to no loss of optimality: the semidefinite programming above returns the globally optimal solution to the problem stated previously as LSPC. Some implementations described herein may use the splitting conic solver ("SCS") for solving large-scale convex cone problems.

The contraction property of CVF-P generalizes to a wider region in the state space. The next proposition shows that any sufficiently smooth vector field that is feasible for the problem stated in LSPC-SOS is contracting on a "tube" around the demonstrated trajectories.

Proposition 1 (A lower bound on the contraction tube): If f: $\Omega \subseteq \mathbb{R}^n \to \mathbb{R}^n$ is a twice continuously differentiable vector field that satisfies $$-sym[M(x(t))J_f(x(t))] - \dot{M}(x(t)) \succeq \tau M(x) \forall t \in [0, T]$$

where $\Omega$ is a compact region of $\mathbb{R}^n$, τ is a positive constant, M(x) is a positive definite metric, and x: [0, T]↦ $\mathbb{R}^n$ is a path, then f is τ/4-contracting with respect to the metric M(x) on the region U defined by $$U := \{x(t) + \delta \in [0, T], \|\delta\|_2 \leq \epsilon\} \cap \Omega,$$

where ϵ is positive scalar depending only on the smoothness parameters and defined explicitly in Eqn (11).

For the proof, the following fact about symmetric matrices will be used:

Lemma 1: For any n×n symmetric matrices A and B $$|\lambda_{min}(A) - \lambda_{min}(B)| \leq n \max_{ij}|A_{ij} - B_{ij}|,$$

where $\lambda_{min}(\cdot)$ denotes the smallest eigenvalue function.

Proof Let f, M, $\Omega$ and τ be as in the statement of Proposition 1. Define $c = \max\{\lambda \geq 0 | M(x) \succeq \lambda M(y) \forall x, y \in \Omega\}$ $C = \min\{\lambda \geq 0 | \lambda M(x) \succeq (\forall x, y \in \Omega\}$.

Notice that c≤C, and since the metric M(x) is uniformly positive definite, then c>0. The following definition will be used:

$$\varepsilon := \frac{TC}{2nLC} > 0 \quad (11)$$

where $$L := \sup_{x \in \Omega} \sum_{1 \leq i,j \leq n} \left\| \frac{\partial}{\partial x}\left(sym[M(x)J_f(x)] + \dot{M}(x)\right)_{ij} \right\|_2.$$

Fix t∈[0, T], and let δ be a vector in ℝ such that $\|\delta\|_2 \leq \epsilon$. The goal is to prove that the matrix:

$R^{\delta} := -sym[M(x)(t) + \delta)J_f(x(t) + \delta)] - \dot{M}(x(t) + \delta)$ satisfies $R^{\delta} \succeq \tau/2 M(x(t) + \delta)$. Notice that the choice for L guarantees that the maps $\delta \mapsto R_{ij}^{\delta}$ are L-Lipchitz for i, j=1, ..., n, therefore $\max_{ij}|R_{ij}^{\delta} - R_{ij}^{0}| \leq L\delta$. Using Lemma 1 it can be seen that the smallest eigenvalues of $R^{\delta}$ and $R^0$ are within a distance of $$\frac{\tau c}{2C}$$

each other. Since it is assumed that $R^0 \succeq \tau M(x(t)) \succeq c\tau I$, then $R^{\delta} \succeq CI \succeq M(x(t) + \delta)$.

Pick-and-Place with Obstacles

A "pick-and-place" robot task is a task in which objects are picked by a robot from a known location and placed into another location such as a box. With techniques described herein, a teleoperator can demonstrate a relatively small number of trajectories that guide a robot arm to grasp objects and place them in a box. After learning from these demonstrations, the robot arm is expected to continually fill boxes to be verified and moved by a human working in close proximity freely moving obstacles in and out of the workspace.

Figure 6A:
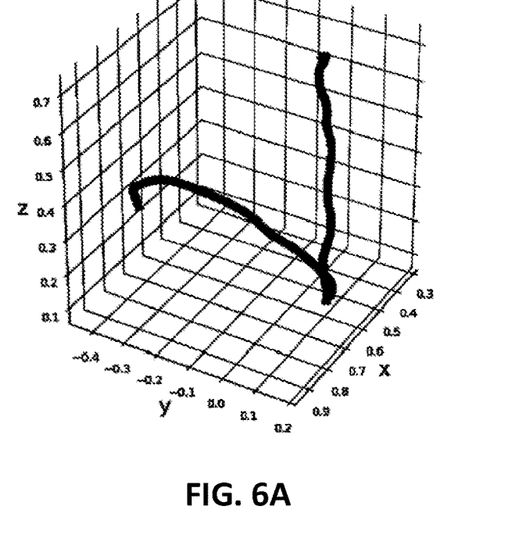
FIGS. 6A, 6B, 6C, 6D, 6E, 6F, and 6G depict examples of trajectories, some of which are used and/or generated using techniques described herein.
Figure 6B:
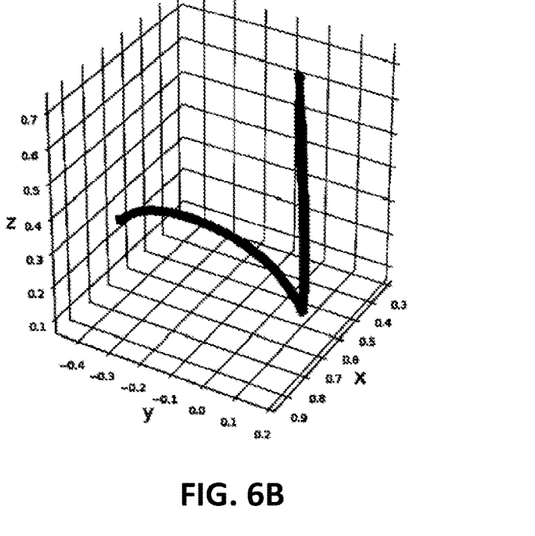

FIG. 6A shows an example of a demonstration pick and place trajectory collected from a user. The pick and place task was collected as two separate trajectories, one (downward motion) for the pick motion and another (arc from right to left) for the place motion. From this demonstration trajectory, a composition of pick-and-place polynomial contracting vector fields ("CVP-Ps") are fit to the data, one for the pick motion, one for the place. These trajectories were fit to a degree two polynomial with τ=0.1, α=$10^{-8}$, using a splitting conic solver ("SCS") run for 2,500 iterations. For the ease of visualization, the resulting trajectories are depicted in Cartesian space in FIG. 6B. The CVF-P was fit to the trajectory in the 7-dimensional joint space. The robot arm was then operated using the CVF-P eight times starting from the home position. Each trajectory was allowed to run until the $\mathcal{L}_2$—norm of the arm joint velocities dropped below a threshold of 0.01. At that point, the arm would begin to move using the second vector field. The trajectories taken by the arm are shown in FIG. 6B. The eight runs have very little deviation from each other.

Figure 6C:
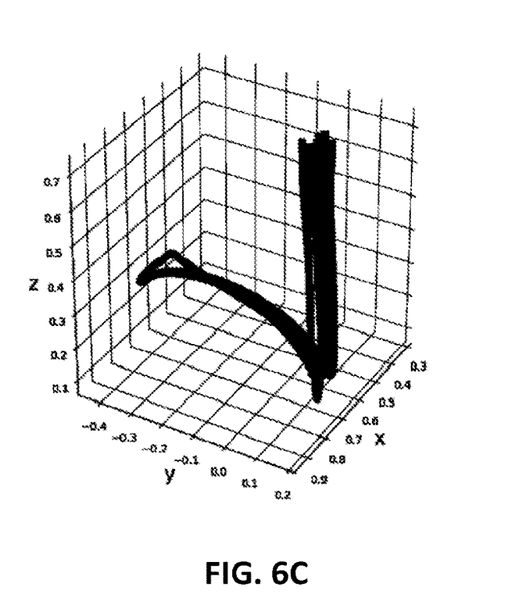
Figure 6D:
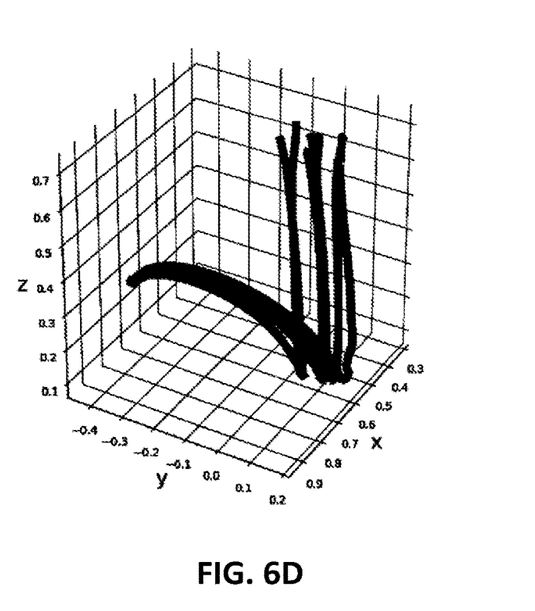

Next, noise was added to the home position of the robot arm, and again the CVF-P was used to operate the robot arm through the pick-and-place task. In FIG. 6C, noise was added uniformly from the range [−0.05, 0.05] radians to each value of each joint of the arm's starting home position. In FIG. 6D, uniform noise was added in the same manner from the range [−0.1, 0.1]. Due to contraction, trajectories are seen to converge from random initial conditions.

Figure 6E:
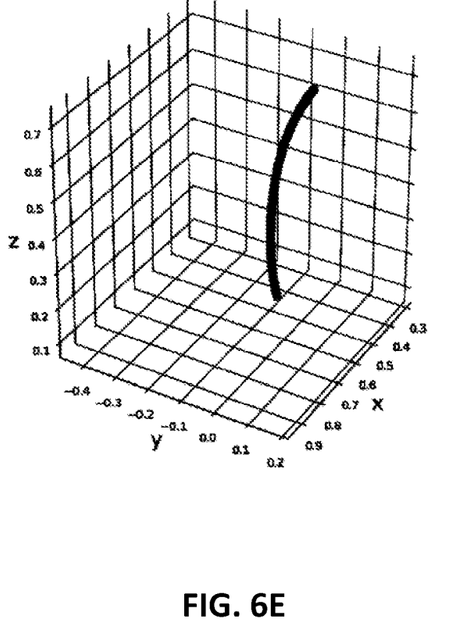
Figure 6F:
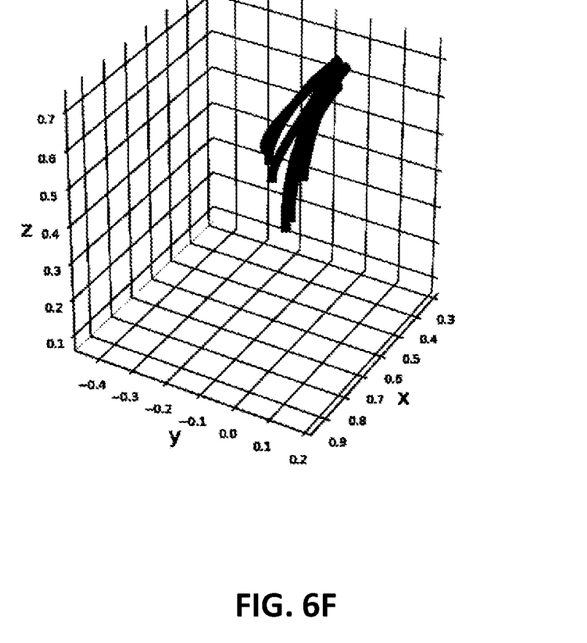

FIG. 6E demonstrates what happens if the robot arm is run eight times using a vector field without contraction. While the arm is consistent in the trajectory that it takes, the arm moves far from the demonstrated trajectory, and eventually causes an emergency break to activate at joint limits, and the task fails. This problem is exacerbated when noise is added. For example, in FIG. 6F, the arm was again run eight times without contraction with noise added uniformly from the range [−0.05, 0.05] to each the value of each joint of the arm's starting home position. The trajectory of the arm varied widely and had to be cut short as it caused an emergency break to engage.

In various implementations, a robot arm can be operated to follow demonstrated trajectories while avoiding obstacles unseen during training. In the implementation described below, collisions are avoided against any part of robot body. At every time step, a depth sensor (e.g., 2.5 or 3D vision sensor) acquires a representation of the obstacle, such as a point cloud. At this point, the demonstrations and trajectories exist in joint space $\mathcal{J} \approx \mathbb{R}^7$, while the obstacle exists (e.g., as a point cloud) in Cartesian space $\mathcal{C} \approx \mathbb{R}^3$ with an origin at the base of the robot.

In some implementations, a set-valued inverse kinematic map IK is precomputed that maps a position $c \in \mathcal{C}$ to a subset of $\mathcal{J}$ a containing all the joint configurations that would cause any part of the arm to occupy the position c. More formally, the obstacles positions are known in Cartesian space $\mathcal{C}$, which is different from the control space $\mathcal{J}$ of the robot (e.g., the joint angles are controlled, rather than end-effector pose). A robot arm simulator enables queries of a forward kinematics map FK: $\mathcal{J} \to \mathcal{C}$. To compute the inverse of this map, the joint space of the robot may be discretized into some number (e.g., 658,945) discrete positions. These discrete positions may be created, for instance, by regularly sampling each joint from a min to max angle using a step size of, for instance, 0.1 radians. In some implementations, the robot may be positioned in a simulator at each point of the discrete joint space points. The robot may then be voxelized to generate the map FK. IK can be computed as the inverse of FK: IK=FK$^{-1}$.

Figure 8A:
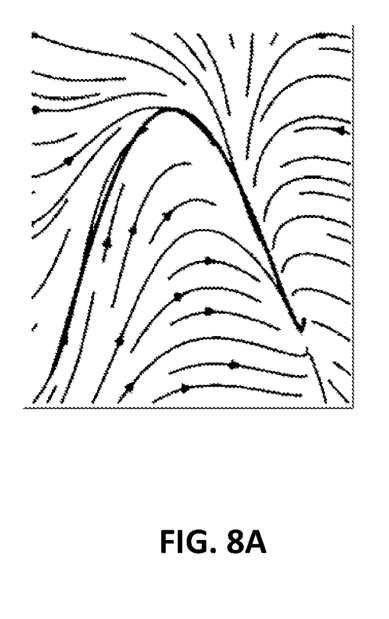
FIGS. 8A, 8B, and 8C demonstrate one example of how a polynomial vector field may be modulated based on a detected obstacle, in accordance with various implementations.
Figure 8B:
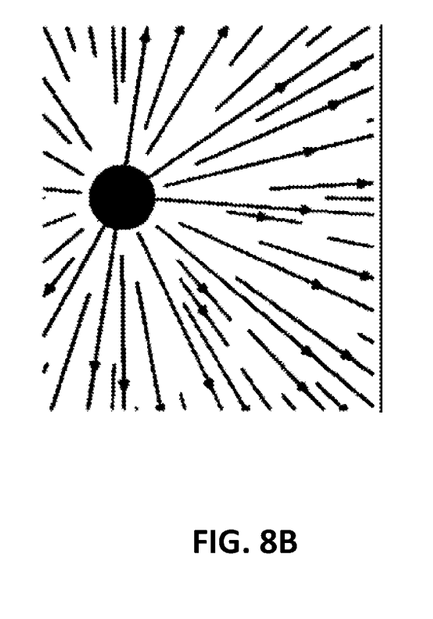
Figure 8C:
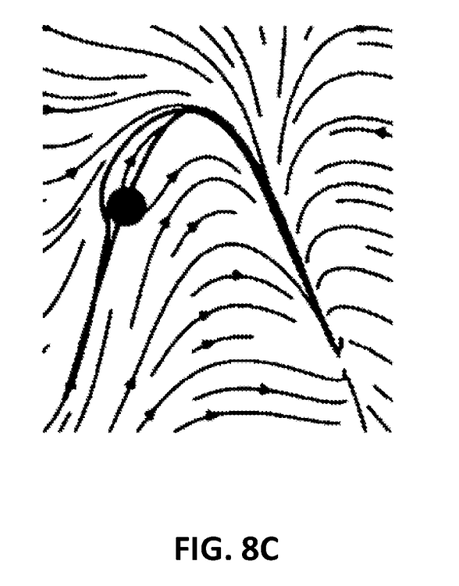

In various implementations, the obstacle positions may then be incorporated in a repulsive vector-field to push the arm away from collision as it moves, $$h^{obstacles}(t, x) := \sum_{\substack{positions\ of \\ obstacles\ c \\ at\ time\ t}} \sum_{j \in T^{-1}c} \frac{x-j}{\|x-j\|_2^r}, \quad (12)$$

where the integer r control how fast the effect of this vector field decays as a function of distance (a high value of r makes the effect of $h^{obstacles}$ local, while a small value makes its effect more uniform.) This vector field may be added to the learnt vector-field f to obtain a modulated vector field (depicted in FIG. 8C):

$$\tilde{f}(t, x) = f(x) + \alpha h^{obstacles}(t, x)$$

where α is positive constant that is responsible controlling the strength of the modulation that is then fed to the robot arm. If the modulation is local and the obstacle is well within the joint-space contraction tube, the motion can be expected to re-converge to the demonstrated behavior.

Obstacle avoidance is not limited to the modulation methods described herein. Other modulation techniques are possible for obstacle avoidance, each with different guarantees and drawbacks. For example, a multiplicative modulation function may be employed that preserves equilibrium points in the case of convex or concave obstacles. However, the modulation techniques described herein, due to their additive nature, allow for handling of a large number of obstacles as every term in Equation (14) can be computed in a distributed fashion. Additionally, it is not necessary to impose any restrictions on the shape of the obstacles (convex/concave). This is particularly important as the joint control space $\mathcal{J}$ is different from the Cartesian space $\mathcal{C}$ where the obstacle is observed, and the map IK that links between the two spaces can significantly alter the shape of an obstacle in general (e.g. a sphere in Cartesian space can be mapped to a disconnected set in joint space).

Figure 6G:
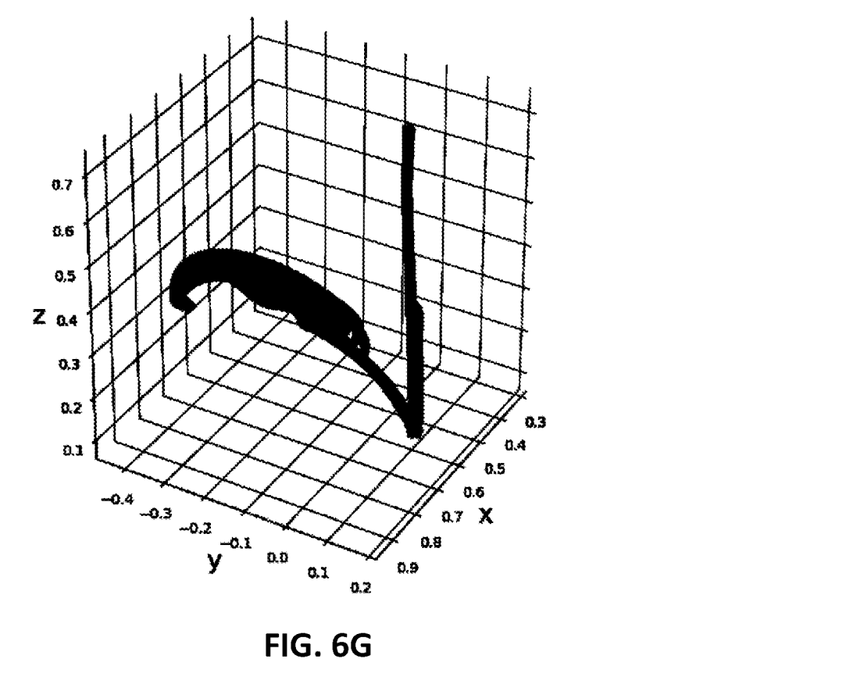

FIG. 6G depicts eight trajectories that were achieved using a CVF-P generated using techniques described herein, where an obstacle was introduced to the robot's workspace. At each time step, the object's position was returned by a motion capture system. The object's position in Cartesian space was used to modulate the joint space vector field as described previously. The pick-and-place tasks were accomplished as the robot arm avoided the obstacle but remained within the joint-space contraction tube re-converging to the demonstrated behavior.

Figure 7:
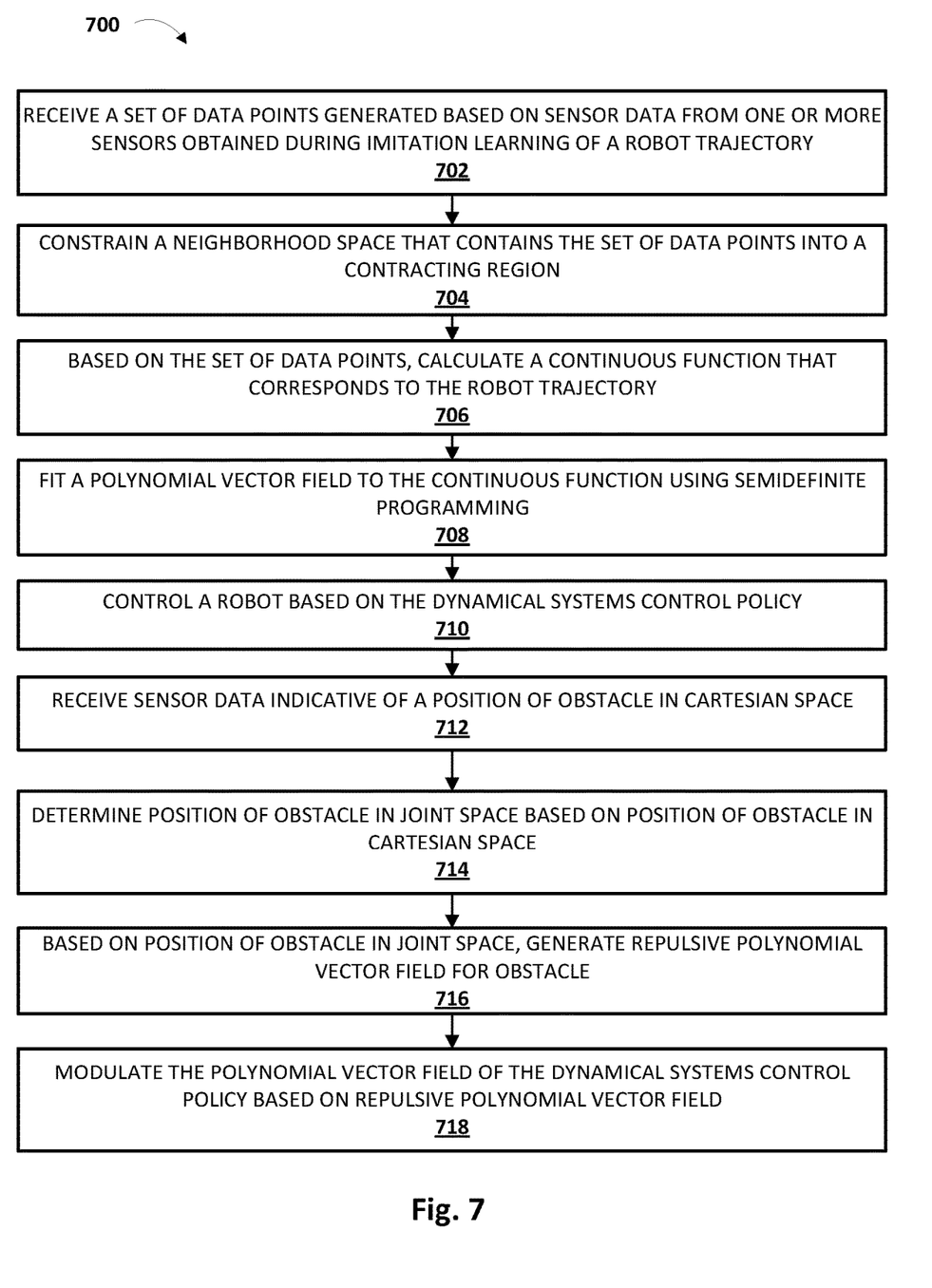
FIG. 7 depicts an example method for practicing selected aspects of the present disclosure, in accordance with various implementations.

FIG. 7 illustrates a flowchart of an example method 700 for practicing selected aspects of the present disclosure. The steps of FIG. 7 can be performed by one or more processors, such as one or more processors of the various computing devices/systems described herein. For convenience, operations of method 700 will be described as being performed by a system configured with selected aspects of the present disclosure. Other implementations may include additional steps than those illustrated in FIG. 7, may perform step(s) of FIG. 7 in a different order and/or in parallel, and/or may omit one or more of the steps of FIG. 7.

At block 702, the system may receive a set of data points generated based on sensor data from one or more sensors obtained during imitation learning of a robot trajectory. The imitation learning may include, for instance, physical manipulation of a reference point from an initial point to a target point.

At blocks 704-708, the system may generate a dynamical systems control policy that regulates both robot motion and robot interaction with an environment. For example, at block 704, the system may constrain a neighborhood space that contains the set of data points into a contracting region. In some such implementations, the contracting region may take the form of a tube around the robot trajectory. At block 706, the system may, based on the set of data points, calculate a continuous function that corresponds to the robot trajectory. At block 708, the system may fit a polynomial vector field to the continuous function using semidefinite programming, as described previously.

At block 710, the system may control a robot based on the dynamical systems control policy. If the robot encounters an obstacle during operation, at block 712, the system may receive sensor data indicative of a position of the obstacle in Cartesian space. For example, a dynamic obstacle may be observed in the robot's workspace using a 2.5 or 3D vision sensor. At block 714, the system may determine a position of the obstacle in joint space based on the position of the obstacle in Cartesian space. As described previously, in some implementations, the system may discretize some number of joint configurations and determine a forward kinematics ("FK," i.e. joint-space-to-Cartesian-space) mapping based on those discretized joint configurations. Then, the system may calculate an inverse of that mapping, IK, which maps Cartesian space to joint space. At block 716, based on the position of the obstacle in joint space, the system may generate a repulsive polynomial vector field for the obstacle.

At block 718, the system may modulate the polynomial vector field of the dynamical systems control policy based on the repulsive polynomial vector field for the obstacle. An example of this is depicted in FIGS. 8A-C. FIG. 8A depicts a vector field F learned from a nominal path (thickened black line). FIG. 8B depicts a repulsive vector field associated with an obstacle (black disk). FIG. 8C depicts a modulated vector field that results when the unmodulated vector field of FIG. 8A is modulated with the repulsive vector field in FIG. 8B, with the black disk in FIG. 8C representing the obstacle.

Described herein were implementations for teleoperator imitation using contracting vector fields that are globally optimal with respect to loss minimization and providing continuous-time guarantees on the behavior of the system when started from within a contraction tube around the demonstration. Techniques described herein compare favorably with other movement generation techniques. Also described herein are techniques to generate a workspace Cartesian to joint space mapping for the robot, and for utilizing the mapping to update contracting vector fields on the fly to avoid dynamic obstacles.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving a set of data points generated based on sensor data from one or more sensors obtained during imitation learning of a robot trajectory, wherein the imitation learning includes physical manipulation of a reference point from an initial point to a target point;
   generating a dynamical systems control policy that regulates both robot motion and robot interaction with an environment, wherein generating the dynamical systems control policy comprises:
      based on the set of data points, calculating a continuous function that corresponds to the robot trajectory,
      constraining a neighborhood space that contains the set of data points into a contracting region, and
      fitting a polynomial vector field to the continuous function using semidefinite programming, wherein the dynamical systems control policy comprises the polynomial vector field; and
   controlling a robot based on the dynamical systems control policy.

2. The method of claim 1, wherein the contracting region comprises a tube around the robot trajectory.

3. The method of claim 1, further comprising:
   receiving sensor data indicative of a position of an obstacle in Cartesian space;
   determining a position of the obstacle in joint space based on the position of the obstacle in Cartesian space;
   based on the position of the obstacle in joint space, generating a repulsive polynomial vector field for the obstacle; and
   modulating the polynomial vector field of the dynamical systems control policy based on the repulsive polynomial vector field for the obstacle.

4. The method of claim 3, wherein the position of the obstacle in joint space is determined based on a mapping from Cartesian space to joint space.

5. The method of claim 4, wherein the mapping is generated by:
   discretizing the joint space of the robot into a plurality of discrete positions;
   voxelizing the robot at each of the plurality of discrete positions to generate a mapping from joint space to Cartesian space; and
   calculating the mapping from Cartesian space to joint space as an inverse of the mapping from joint space to Cartesian space.

6. The method of claim 5, wherein the discretizing comprising regularly sampling each joint of the robot from a minimum angle to a maximum angle using a predetermined step size.

7. A control system, comprising:
   one or more robots;
   memory storing instruction; and
   one or more processors operable to execute the instructions stored in the memory, comprising instructions to:
   receive a set of data points generated based on sensor data from one or more sensors obtained during imitation learning of a robot trajectory, wherein the imitation learning includes physical manipulation of a reference point from an initial point to a target point;
   generate a dynamical systems control policy that regulates both robot motion and robot interaction with an environment, wherein generating the dynamical systems control policy comprises:
      based on the set of data points, calculate a continuous function that corresponds to the robot trajectory,
      constrain a neighborhood space that contains the set of data points into a contracting region, and
      fit a polynomial vector field to the continuous function using semidefinite programming, wherein the dynamical systems control policy comprises the polynomial vector field; and
   control a robot based on the dynamical systems control policy.

8. The control system of claim 7, wherein the contracting region comprises a tube around the robot trajectory.

9. The control system of claim 7, further comprising instructions to:
receive sensor data indicative of a position of an obstacle in Cartesian space;
determine a position of the obstacle in joint space based on the position of the obstacle in Cartesian space;
based on the position of the obstacle in joint space, generate a repulsive polynomial vector field for the obstacle; and
modulate the polynomial vector field of the dynamical systems control policy based on the repulsive polynomial vector field for the obstacle.

10. The control system of claim 9, wherein the position of the obstacle in joint space is determined based on a mapping from Cartesian space to joint space.

11. The control system of claim 10, wherein the mapping is generated by:
discretizing the joint space of the robot into a plurality of discrete positions;
voxelizing the robot at each of the plurality of discrete positions to generate a mapping from joint space to Cartesian space; and
calculating the mapping from Cartesian space to joint space as an inverse of the mapping from joint space to Cartesian space.

12. The control system of claim 11, wherein the discretizing comprising regularly sampling each joint of the robot from a minimum angle to a maximum angle using a predetermined step size.

13. A non-transitory computer-readable storage medium comprising instructions that, when executed, cause at least one processor to:
receive a set of data points generated based on sensor data from one or more sensors obtained during imitation learning of a robot trajectory, wherein the imitation learning includes physical manipulation of a reference point from an initial point to a target point;
generate a dynamical systems control policy that regulates both robot motion and robot interaction with an environment, wherein generating the dynamical systems control policy comprises:
based on the set of data points, calculate a continuous function that corresponds to the robot trajectory,
constrain a neighborhood space that contains the set of data points into a contracting region, and
fit a polynomial vector field to the continuous function using semidefinite programming, wherein the dynamical systems control policy comprises the polynomial vector field; and
control a robot based on the dynamical systems control policy.

14. The non-transitory computer-readable storage medium of claim 13, wherein the contracting region comprises a tube around the robot trajectory.

15. The non-transitory computer-readable storage medium of claim 13, further comprising instructions to:
receive sensor data indicative of a position of an obstacle in Cartesian space;
determine a position of the obstacle in joint space based on the position of the obstacle in Cartesian space;
based on the position of the obstacle in joint space, generate a repulsive polynomial vector field for the obstacle; and
modulate the polynomial vector field of the dynamical systems control policy based on the repulsive polynomial vector field for the obstacle.

16. The non-transitory computer-readable storage medium of claim 15, wherein the position of the obstacle in joint space is determined based on a mapping from Cartesian space to joint space.

17. The non-transitory computer-readable storage medium of claim 16, wherein the mapping is generated by:
discretizing the joint space of the robot into a plurality of discrete positions;
voxelizing the robot at each of the plurality of discrete positions to generate a mapping from joint space to Cartesian space; and
calculating the mapping from Cartesian space to joint space as an inverse of the mapping from joint space to Cartesian space.

* * * * *